No. 765,518. PATENTED JULY 19, 1904.
J. J. SMITH.
STREET CLEANER.
APPLICATION FILED SEPT. 22, 1903.
NO MODEL. 3 SHEETS—SHEET 1.

WITNESSES:

INVENTOR
John J. Smith
BY
ATTORNEYS

INVENTOR
John J. Smith

No. 765,518.

Patented July 19, 1904.

UNITED STATES PATENT OFFICE.

JOHN J. SMITH, OF JOLIET, ILLINOIS.

STREET-CLEANER.

SPECIFICATION forming part of Letters Patent No. 765,518, dated July 19, 1904.

Application filed September 22, 1903. Serial No. 174,147. (No model.)

*To all whom it may concern:*

Be it known that I, JOHN J. SMITH, a citizen of the United States, and a resident of Joliet, in the county of Will and State of Illinois, have invented a new and Improved Street-Cleaner, of which the following is a full, clear, and exact description.

The object of the invention is to provide a new and improved street-cleaner arranged to free the street of all dirt, litter, and the like by the use of jets of water under pressure and directed in such a manner as to wash the dirt, litter, &c., into the curb or gutter, from which it can readily flow to the sewer or other place of discharge or can be gathered in heaps, if desired.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
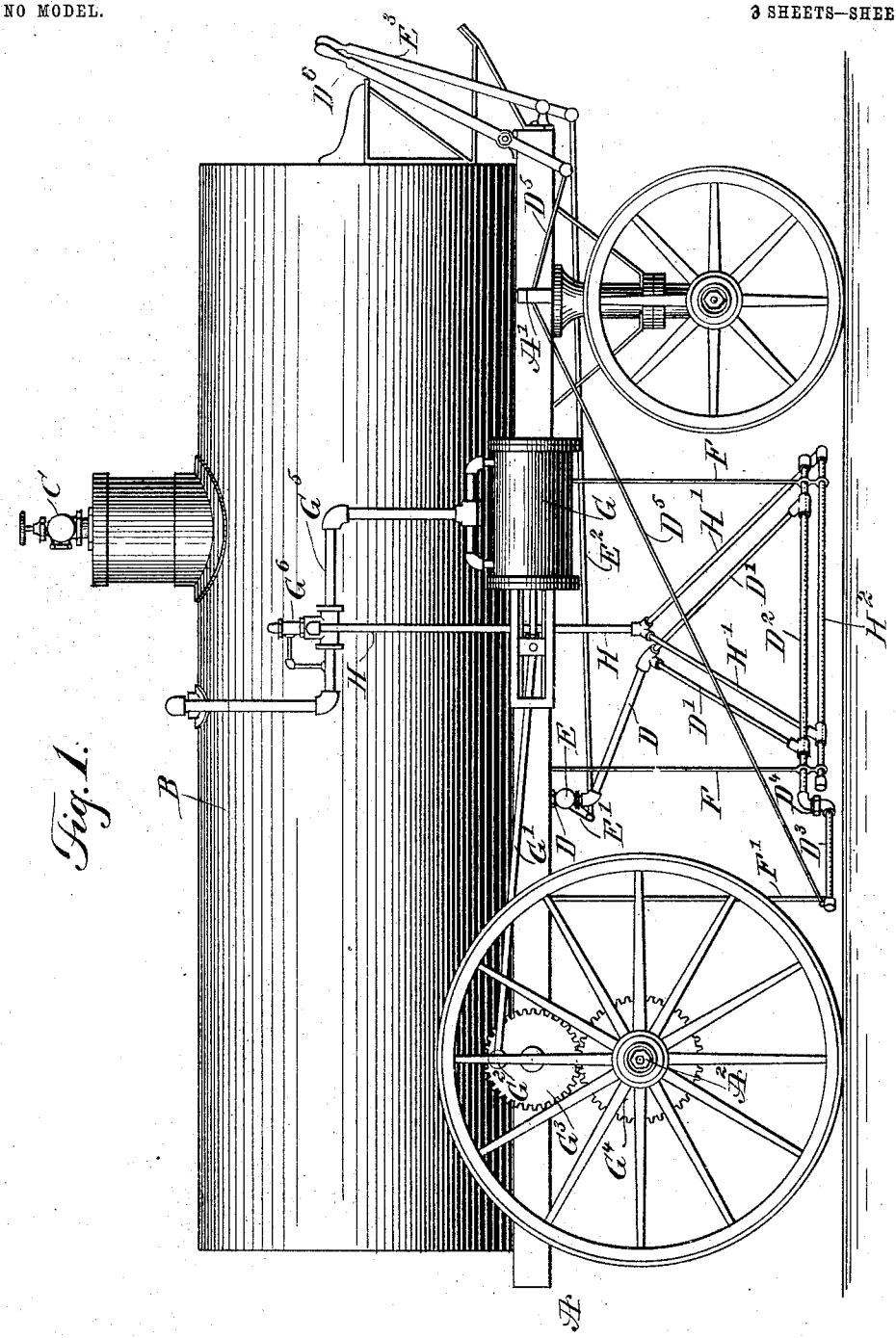
Figure 2:
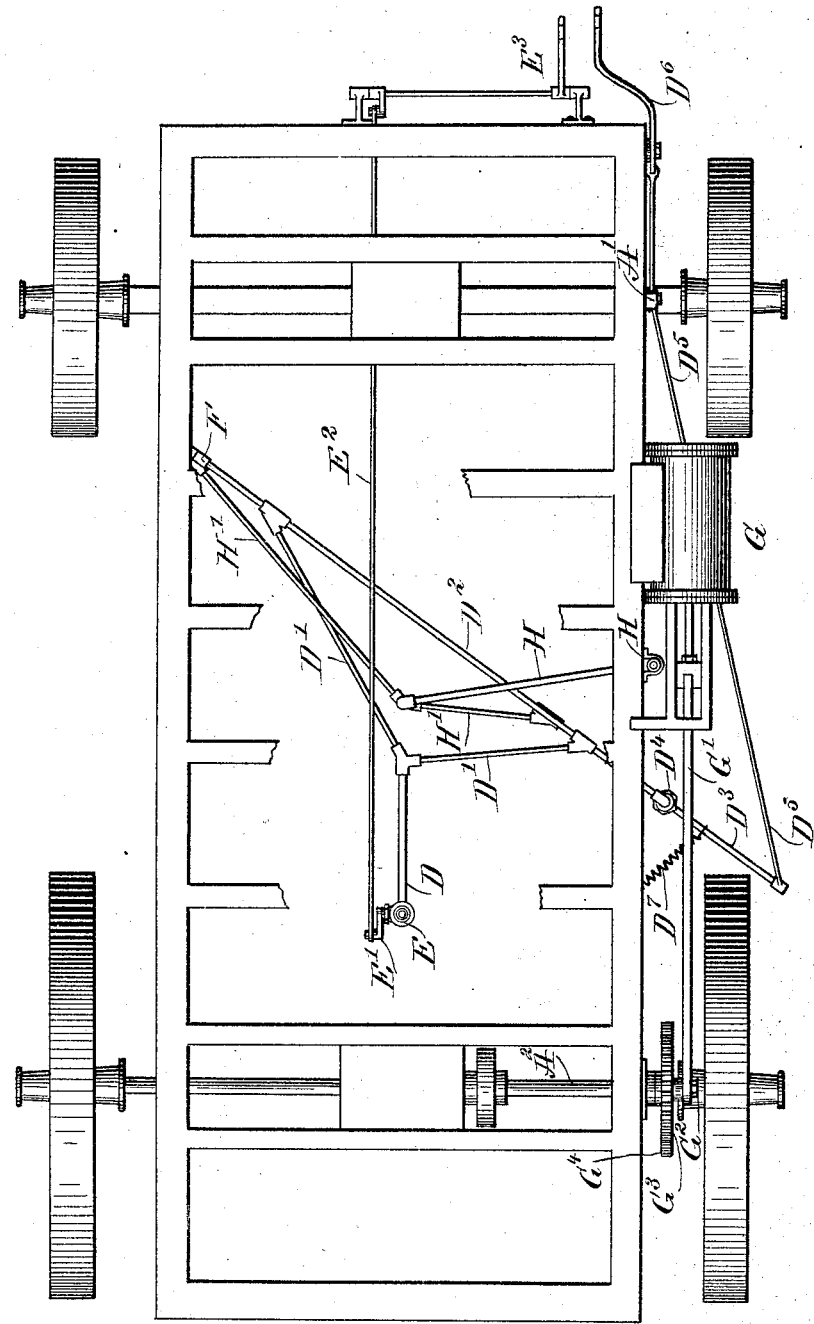
Figure 3:
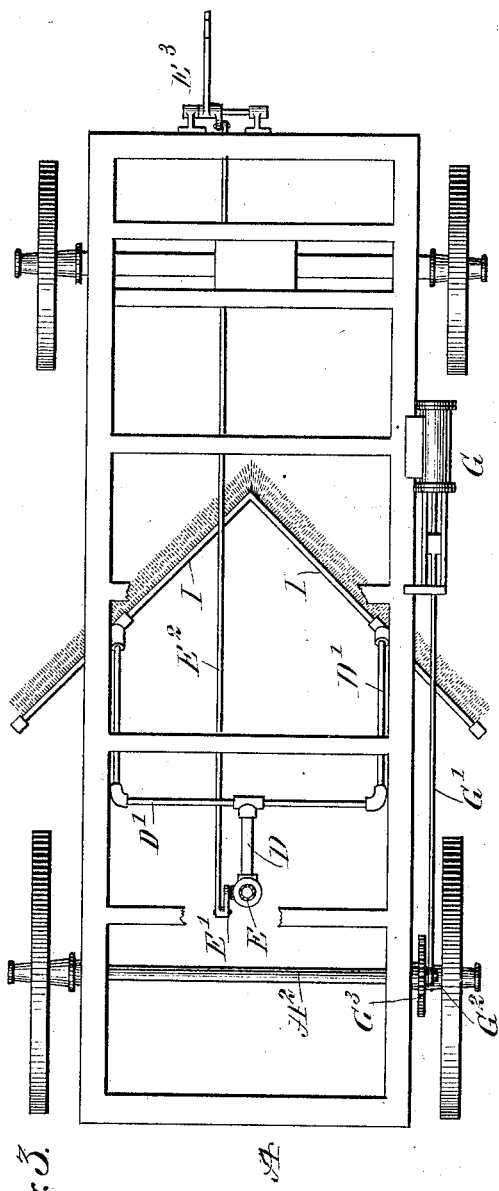
Figure 4:
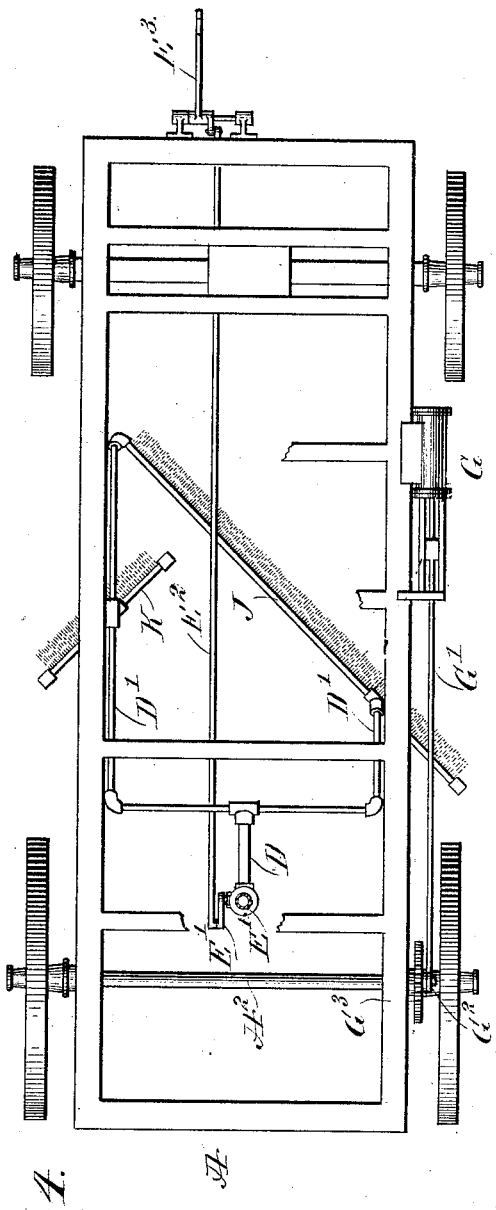

Figure 1 is a side elevation of the improvement. Fig. 2 is a plan view of the same, the water-tank being removed. Fig. 3 is a like view of a modified form of the improvement, and Fig. 4 is a similar view of another modified form of the improvement.

The improved street-cleaner is mounted on a wheeled vehicle A of any approved construction and adapted to be drawn through the street either by a team of horses or by a motor mounted on the vehicle, and on the body of the said vehicle is mounted a compressed-air and water tank B, provided at its top with a suitable valved filling-pipe C for connection with a hydrant or other water-supply for filling the tank B with water.

From the bottom of the tank B extends a water-pipe D, having a valve E, the stem of which is provided with an arm E', connected by a link $E^2$ with a lever $E^3$, under the control of the operator seated on the front end of the vehicle A, so as to enable the operator to open or close the valve E more or less, as required.

The pipe D is connected by branch pipes D' with a perforated water-pipe $D^2$, extending transversely close to the surface of the street and supported between the front and rear wheels of the vehicle by brackets F, depending from the body of the vehicle A. When the valve E is open, water flows under pressure from the tank B through the pipe D and branch pipes D' into the perforated water-pipe $D^2$, so that jets of water issue from this pipe at an angle to the forward line of movement of the vehicle, so that the dirt, litter, and the like on the street-surface is washed to one side—that is, to the gutter.

At the rear end of the pipe $D^2$ is arranged an extension perforated pipe $D^3$, connected with the pipe $D^2$ by a pivot-joint $D^4$ to allow of swinging the extension-pipe $D^3$ from an alined position, as shown in Fig. 2, into an angular position relative to the pipe $D^2$, so as to prevent the dirt, litter, and the like from being washed onto a cross-street when passing the same, it being understood that the said extension-pipe $D^3$ is for the purpose mentioned under the control of the operator seated on the front end of the vehicle. The free end of the pipe $D^3$ is connected by a rope, rod, or cable $D^5$ with a lever $D^6$ within convenient reach of the operator, the said rope passing over a suitable guide A', arranged on one side of the vehicle-body. A spring $D^7$ is connected with the pipe $D^3$ for normally holding the same in alinement with the pipe $D^2$, and when it is desired to swing the pipe $D^3$ into a transverse position—that is, at right angles to the forward movement of the vehicle—then the operator moves the lever $D^6$ correspondingly to swing the pipe $D^3$ forward against the tension of the spring $D^7$. After the cross-street has been passed the operator moves the lever $D^6$ so that the spring $D^7$ returns the pipe $D^3$ to its normal alined position relative to the pipe $D^2$. In practice the pipe $D^2$ extends with its forward end, say, from the middle of the street toward the gutter, while the branch pipe $D^3$ extends close to the gutter, but can be swung into the angular position above described for the purpose mentioned and for carrying the litter forward in heaps.

In order to forcibly eject the water through the perforations in the pipe $D^2$, compressed air is used in the tank B, and for this purpose an air-compressor G is mounted on the body of the vehicle A, and the pitman G' of the air-compressor is connected with a wrist-pin $G^2$, secured on a gear-wheel $G^3$, mounted to turn loosely on a stud carried by the body of the vehicle A. The gear-wheel $G^3$ is in mesh with a gear-wheel $G^4$, fastened on the rear axle $A^2$ of the vehicle, so that when the vehicle is moved forward the air-compressor G is actuated from the rear axle $A^2$ to pump air by a pipe $G^5$ into the top of the tank B. The pressure of the air on the top of the water in the tank B ejects the water forcibly through the perforations in the pipe $D^2$, and as the said perforations extend on the front of the pipe and the pipe is disposed diagonally relative to the movement of the vehicle it is evident that the forceful jets of water readily wash the dirt, litter, and the like gradually from the center of the street to the gutter without raising any dust.

In using the machine it is drawn up one side of the street first and down the other; but for narrow streets the arrangement shown in Fig. 3 may be used—that is, two perforated pipes I, arranged in V shape, are provided, extending with their ends close to the gutter, so that the dirt and other impurities are washed from the center of the street toward both gutters. Both sides of the street may also be washed by using a single diagonal pipe J, similar to the pipe $D^2$, having in addition thereto an angular pipe K, located somewhat in the rear of the forward end of the pipe J; but this pipe K can be moved out of action, if desired.

In case a surplus of compressed air is produced then this surplus air may be utilized to assist in directing the dirt, litter, and the like to the side of the street, and for this purpose a safety-valve $G^6$ on the pipe $G^5$ is connected by a pipe H and branch pipes H' with a perforated air-pipe $H^2$ in vertical alinement with the pipe $D^2$ and preferably located directly under the same, as plainly indicated in the drawings. Whenever a surplus of compressed air is produced, this air passes from the safety-valve $G^6$ by the pipes H H' into the pipe $H^2$ and through the perforations thereof onto the street-surface to assist the jets of water in forcing the dirt, litter, and the like toward the gutter or one side of the street.

Having thus described my invention, I claim as new and desire to secure by Letters Patent—

1. A street-cleaner comprising a wheeled vehicle, a compressed-air and water supply tank mounted on the vehicle, a perforated pipe connected with the said tank and extending diagonally on the said vehicle, close to the street-surface, an air-compressor mounted on and driven from the said vehicle and discharging into the said tank, and a perforated air-pipe mounted on the vehicle and extending diagonally, the said air-pipe being connected with the said tank, as set forth.

2. A street-cleaner comprising a wheeled vehicle, a compressed-air and water supply tank mounted on the vehicle and provided with a safety-valve, a perforated pipe connected with the said tank and extending diagonally on the said vehicle, close to the street-surface, an air-compressor mounted on and driven from the said vehicle and discharging into the said tank, and a perforated air-pipe mounted on the vehicle and extending diagonally, the said air-pipe being connected with the said tank at the safety-valve thereof, as set forth.

3. A street-cleaner comprising a wheeled vehicle, a compressed-air and water supply tank mounted on the vehicle, a perforated pipe connected with the said tank and extending diagonally on the said vehicle, close to the street-surface, and an extension perforated pipe connected with and mounted to swing on the rear end of the said perforated water-pipe, the said extension-pipe being mounted to swing in a horizontal plane and arranged to extend in alinement with the perforated pipe or to be moved into an angular position relative to said pipe, as set forth.

4. A street-cleaner comprising a wheeled vehicle, a compressed-air and water supply tank mounted on the vehicle, a perforated pipe connected with the said tank and extending diagonally on the said vehicle, close to the street-surface, an extension perforated pipe connected with and mounted to swing on the rear end of the said perforated water-pipe, a spring connected with the said extension-pipe, a lever under the control of the operator, and a connection between the said lever and the free end of the said extension-pipe for imparting a swinging motion to the said pipe, against the tension of the spring, as set forth.

In testimony whereof I have signed my name to this specification in the presence of two subscribing witnesses.

JOHN J. SMITH.

Witnesses:
FRANCIS P. SMITH,
CATHRINE SMITH.